(12) United States Patent
Matthews

(10) Patent No.: US 9,122,439 B2
(45) Date of Patent: Sep. 1, 2015

(54) SYSTEM AND METHOD FOR EFFICIENT BUFFER MANAGEMENT FOR BANKED SHARED MEMORY DESIGNS

(71) Applicant: Broadcom Corporation, Irvine, CA (US)

(72) Inventor: William Brad Matthews, San Jose, CA (US)

(73) Assignee: BROADCOM CORPORATION, Irvine, CA (US)

( * ) Notice: Subject to any disclaimer, the term of this patent is extended or adjusted under 35 U.S.C. 154(b) by 232 days.

(21) Appl. No.: 13/927,663

(22) Filed: Jun. 26, 2013

(65) Prior Publication Data

US 2014/0359231 A1    Dec. 4, 2014

Related U.S. Application Data

(60) Provisional application No. 61/829,429, filed on May 31, 2013.

(51) Int. Cl.
*G06F 12/08*  (2006.01)
*G06F 5/14*  (2006.01)
*G06F 9/50*  (2006.01)

(52) U.S. Cl.
CPC ... *G06F 5/14* (2013.01); *G06F 9/50* (2013.01)

(58) Field of Classification Search
CPC ..................... G06F 5/14; G06F 9/50
See application file for complete search history.

(56) References Cited

U.S. PATENT DOCUMENTS

| 2013/0083796 A1 | 4/2013 | Matthews |
| 2014/0052935 A1 | 2/2014 | Matthews |
| 2014/0133483 A1 | 5/2014 | Matthews et al. |
| 2014/0211634 A1 | 7/2014 | Matthews et al. |

OTHER PUBLICATIONS

Matthews et al., "A Scalable Memory-Efficient Architecture for Parallel Shared Memory Switches," High Performance Switching and Routing Workshop, 2007.

*Primary Examiner* — Yong Choe
(74) *Attorney, Agent, or Firm* — Foley & Lardner LLP; Christopher J. McKenna; Helen H. Zhang

(57) ABSTRACT

A system and method for efficient buffer management for banked shared memory designs are provided. In one embodiment, a controller within the switch is configured to manage the buffering of the shared memory banks by allocating full address sets to write sources. Each full address set that is allocated to a write source includes a number of memory addresses, wherein each memory address is associated with a different shared memory bank. A size of the full address set can be based on a determined number of buffer access contenders.

15 Claims, 5 Drawing Sheets

SYSTEM AND METHOD FOR EFFICIENT BUFFER MANAGEMENT FOR BANKED SHARED MEMORY DESIGNS

This application claims priority to provisional application No. 61/829,429, filed May 31, 2013, which is incorporated herein by reference in its entirety.

BACKGROUND

1. Field of the Invention

The present invention relates generally to network switches and, more particularly, to a system and method for efficient buffer management for banked shared memory designs.

2. Introduction

Increasing demands are being placed upon the data communications infrastructure. These increasing demands are driven by various factors, including the increasing bandwidth requirements of Internet multimedia applications (e.g., distribution of news, financial data, software, video, audio and multi-person conferencing, etc). To accommodate the increasing bandwidth requirements, communication link speeds have also continued to evolve. For example, 10 Gigabit Ethernet (GbE) ports are commonly used for I/O on many of today's network switches.

Shared memory is commonly used to build output queued (OQ) switches. An OQ switch is known to maximize throughput, minimize delay and can offer quality of service (QoS) guarantees. Shared memory switches are not believed to scale well to high-capacity switches, however, because the requirements on the memory size, memory bandwidth and memory access time increase linearly with the line rate R and the number of ports N. For example, an N-port switch would need to operate N times faster than the line rate to achieve full throughput.

Consider, for example, a 128×10 Gbps switch. Here, a packet arrival rate using 10 Gbps for 64 bytes along with a 20 byte interpacket gap (IPG) is approximately 67 ns. The memory would therefore be required to perform a read and write in approximately 67 ns. For a 128 port 10 Gbps switch, the memory would be required to support all reads and writes in the time required to receive a single 65 byte packet. Thus, an access time of 67 ns/(128 reads+128 writes)=approximately 250 ps. As would be appreciated, a 250 ps access time is not practical for the technology of today's switches.

For this reason, development of high-capacity switches is moving towards banks of memories for scalability. With multiple banks of shared memories, bandwidth requirements can be evenly distributed across multiple memories, thereby increasing the memory access time required. For example, the average memory bandwidth required for unicast traffic is reduced by 1/m, where m is the number of memories.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
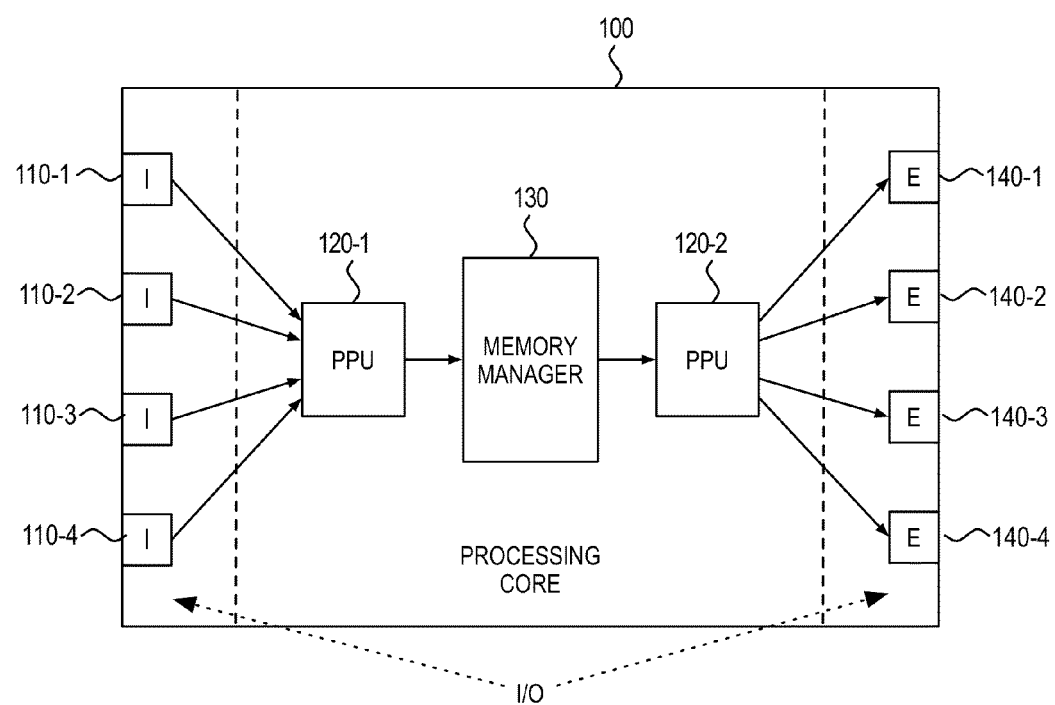
FIG. 1 illustrates an example embodiment of a general switch.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Shared memory is commonly used in a switch (e.g., OQ) to maximize throughput (e.g., burst absorption), minimize delay and offer QoS guarantees. To facilitate scaling of buffer bandwidth, an array of banked shared memories can be used to distribute the memory bandwidth requirement of multiple read and write sources. The efficient buffer management for banked shared memory designs is a significant component in providing the lossless frame delivery needed for modern data center protocols and applications such as fiber channel over Ethernet (FCoE), remote direct memory access (RDMA) over converged Ethernet (RoCE), etc.

In the present invention, efficient buffer management can be provided in a switch having a plurality of shared memory banks that facilitate access by a first number of write sources and a second number of read sources. In one embodiment, a controller within the switch is configured to manage the buffering of the shared memory banks by allocating full address sets to write sources. Each full address set that is allocated to a write source includes a third number of memory addresses, wherein each memory address in the third number of memory addresses is associated with a different shared memory bank. In one embodiment, the third number of memory addresses is at least as large as the first number. In another embodiment, the third number of memory addresses is at least as large as the first and second numbers. A write source writes a packet to one of the memory address in a full address set that has been allocated to the write source. The controller in the switch is further configured to monitor a number of full address sets that are available to a write source, and to generate a flow control message based on the monitoring. In various examples, the flow control message can be a priority-based flow control (PFC) message, a PAUSE message, a service-aware flow control (SAFC) message, etc.

In the present invention, the usage of full address sets by a switch enables a process performed by a switch. In one embodiment, a switch allocates full address sets to one of a first number of write sources that writes packets to a plurality of shared memory banks, the switch also having a second number of read sources reading the packets from the plurality of shared memory banks. Each full address set includes a third number of memory addresses, wherein each memory address in the third number of memory addresses is associated with a different shared memory bank, the third number being at least as large as the first number. The one of the first number of write sources selects one of the memory addresses from an allocated full address set and writes a packet to a shared memory bank at the selected memory address, wherein the writing of the packet to the selected memory addresses removes a status of the address set containing the selected memory address as a full address set. The number of full address sets that are available to the first of the plurality of write sources is then monitored, and a flow control message can be generated based on the monitoring.

FIG. 1 illustrates an example embodiment of a switch that incorporates features of the present invention. As illustrated, switch 100 includes a plurality of ingress ports 110-1 to 110-4, each of which can provide connectivity to other network devices. As an example, each of ingress ports 110-1 to 110-4 can provide 10 GbE connectivity to other switches (e.g., top-of-rack (TOR) switch) in a data center. Similarly, switch 100 includes a plurality of egress ports 140-1 to 140-4, each of which can provide connectivity to other network devices. As would be appreciated, the illustration of ingress ports 110-1 to 110-4 and egress ports 140-1 to 140-4 is an unfolded view of a switch.

In general, ingress ports 110-1 to 110-4 and egress ports 140-1 to 140-4 are included as part of the I/O portion of switch 100. The I/O portion of switch 100 is shown as being logically distinct from the processing core of switch 100. In one embodiment, the processing core of switch 100 includes packet processing units 120-1, 120-2 and memory manager unit 130. In one embodiment, packet processing units 120-1, 120-2 execute real-time operations on packets, such as framing/parsing, classification, traffic policing and shaping, modification, compression/encryption, queuing, etc. Control operations such as translation, route calculation, routing table updates, etc. can also be performed by packet processing units 120-1, 120-2. As would be appreciated, the specific configuration of the processing core of switch 100 is implementation dependent.

Figure 2:
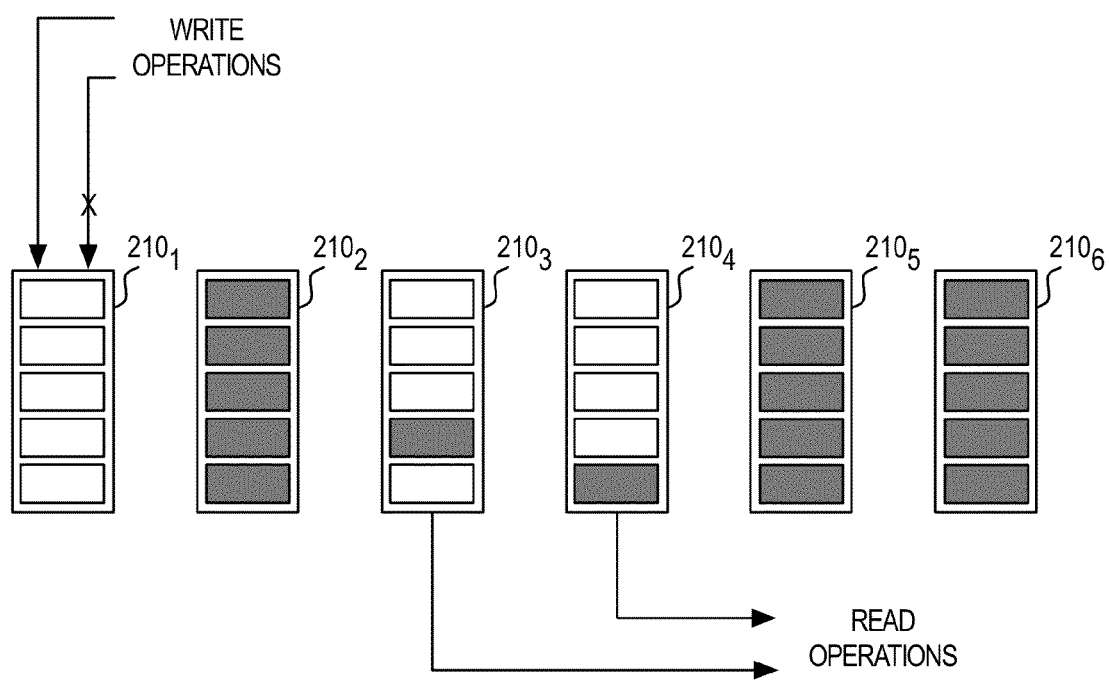
FIG. 2 illustrates an example of read and write access in a switch having banked shared memories.

In one embodiment, memory manager unit 130 employs a packet buffer based on an array of banked shared memories. This array of banked shared memories can enable parallel access by multiple read and write sources. FIG. 2 illustrates an example of read and write access in a switch having banked shared memories to distributed the memory bandwidth requirement.

As illustrated, the switch includes banked shared memories $210_1$-$210_6$. It should be noted that the particular number of banked shared memories used would be implementation dependent. In this example illustration, assume that the switch includes two write sources (e.g., pipelines) and two read sources. A write conflict can occur when more than one write source is attempting to access a single banked shared memory. The illustration of FIG. 2 demonstrates such a conflict as both write sources are attempting to access banked shared memory $210_1$. Write conflicts can also occur where a write source is attempting to access a banked shared memory that is also being accessed by a read source. For example, a write source attempting to access banked shared memory $210_3$ would be in conflict with a read source.

Packet buffer memory bandwidth is generally designed to implement policies that reduce such conflicts. In one example, a read first policy can be implemented by the switch such that a packet buffer guarantees sufficient read bandwidth such that no read conflicts exist. In another example, a write first policy can be implemented by the switch such that a packet buffer operates in a statistical manner whereby conflicting reads are allowed or writes may block reads. In one embodiment, conflicts can be handled by buffering simultaneous requests to the same banked shared memory.

The write conflict example of FIG. 2 demonstrates a scenario where half of the banked shared memories $210_2$, $210_5$, $210_6$ are full and the other half of the banked shared memories $210_1$, $210_3$, $210_4$ have space available. Notwithstanding such available space in banked shared memories $210_1$, $210_3$, $210_4$, one of the write sources would be conflicted as banked shared memory $210_1$ is eligible to handle a write operation for only one of the two write sources. These and other potential write conflict scenarios could preclude the switch from providing lossless frame delivery.

One potential solution of addressing such conflicts is to provide extra banked shared memories. In one example, the number of extra banked shared memories is determined as (the number of write sources)+(the number of read sources)−1. Such extra banked shared memories can ensure that a full advertised buffer, which does not include the extra banked shared memories, can be used. As would be appreciated, the benefits of such extra banked shared memories is offset by area tradeoffs in the on-chip implementation of such solutions. As the number of writers (e.g., pipelines) increases with bandwidth requirements, higher costs are incurred with respect to the extra banked shared memories that are needed.

In the present invention, it is recognized that guaranteed lossless packet buffer performance can be achieved without the need for extra banked shared memories. Indeed, it is a feature of the present invention that access conflicts can be resolved in an efficient manner through a reduction in buffer cell reservation costs. Such reduction in buffer cell reservation costs provides predictable performance in resolving access conflicts to the packet buffer.

Figure 3:
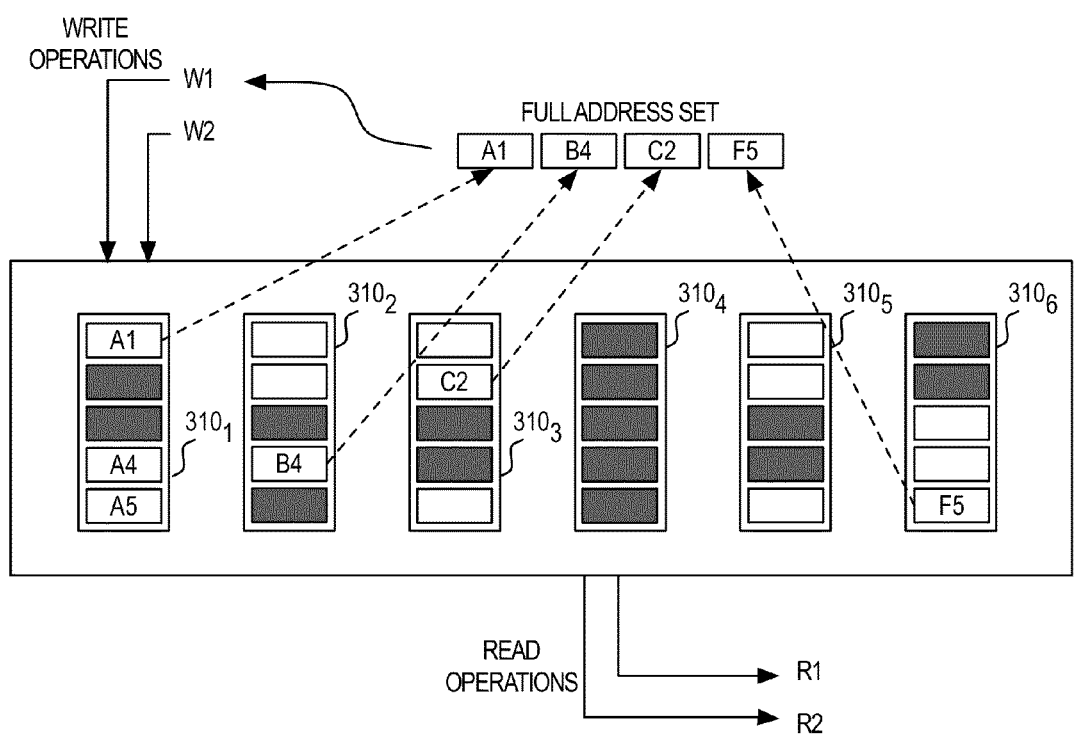
FIG. 3 illustrates an example of a full address set in a switch having banked shared memories that can be allocated to a write source.

To illustrate such a feature of the present invention, reference is now made to FIG. 3, which illustrates an example of a full address set in a switch having banked shared memories that can be allocated to a write source. As illustrated, the switch includes banked shared memories $310_1$-$310_6$. Again, it should be noted that the particular number of banked shared memories used would be implementation dependent. In the illustration of FIG. 2, the cells in banked shared memories $310_1$-$310_6$ that are free are shown in white, while the cells in banked shared memories $310_1$-$310_6$ that are not free are shown in grey. Thus, for example, banked shared memory $310_4$ is full, while banked shared memory $310_1$ has cells A1, A4, A5 that are free.

In this example illustration, assume again that the switch includes two write sources W1, W2 and two read sources R1, R2. For a particular write source W1, a write conflict can be avoided when it is assured that write source W1 will not conflict with either write source W2, read source R1, or read source R2. As write source W2, read source R1, and read source R2 can collectively access, at most, three of the banked shared memories $310_1$-$310_6$ at one time, assuring that write source W1 can access a free buffer cell in a fourth banked shared memory will correspondingly assure that a write conflict will not occur for write source W1.

In the present invention, this condition is satisfied through a cell allocation process enabled by the concept of a full address set. In general, a full address set is a set of memory addresses of free cells, where each memory address in the full address set belongs to a unique banked shared memory. The size of the full address set can be based on the number of buffer access contenders (e.g., read and write sources). Here, it should be noted that the relevant number of buffer access contenders would depend on a particular access policy defined for the switch. For example, the set of buffer access contenders can represent a set of write sources, a set of write sources and read sources, etc.

An example illustration of a full address set is provided in FIG. 3. The example illustration assumes four total buffer access contenders (i.e., two write sources W1, W2 and two read sources R1, R2). Thus, a size of the full address set in this example can be four. A full address set of four memory addresses can then be assembled by the following free cell addresses: cell address A1 in banked shared memory $310_1$, cell address B4 in banked shared memory $310_2$, cell address C2 in banked shared memory $310_3$, and cell address F5 in banked shared memory $310_6$. As illustrated, each of the cell addresses A1, B4, C2 and F5 are taken from different banked shared memories $310_1$-$310_6$. In the current example of four buffer access contenders, a full address set can be generated by identifying a set of memory addresses of free cells that are chosen from any four unique banked shared memories $310_1$-$310_6$.

Once a full address set is identified and assigned to a write source, the write source is then assured that a packet to be written to the packet buffer will not encounter a conflict due to access by another buffer access contender. For the example of a full address set of cell addresses A1, B4, C2 and C5, even if write source W2 accesses banked shared memory $310_1$, read source R1 accesses banked shared memory $310_2$, and read source R2 accesses banked shared memory $310_6$, write source W1 is assured of access to cell address C2 in banked shared memory $310_3$. Similarly, even if write source W2 accesses banked shared memory $310_2$, read source R1 accesses banked shared memory $310_3$, and read source R2 accesses banked shared memory $310_6$, write source W1 is assured of access to cell address A1 in banked shared memory $310_1$.

If write source W1 writes a packet to cell address A1 of banked shared memory $310_1$, then one of the free cells in the full address set has been consumed. The full address set can now be considered a partial address set. Partial address sets are subject to conflict as the write source is not guaranteed from being blocked from another buffer access contender such as a write source or read source. For the example of a partial address set having cell address B4 in banked shared memory $310_2$, cell address C2 in banked shared memory $310_3$, and cell address F5 in banked shared memory $310_6$, write source W1 would experience a conflict if write source W2 accesses banked shared memory $310_2$, read source R1 accesses banked shared memory $310_3$, and read source R2 accesses banked shared memory $310_6$. The partial address set would not have any free cells for write source W1 to use.

As this example illustrates, the allocation of a full address set to a write source assures that the write source will have a free cell location in the packet buffer to perform a write for the next packet to be written by that write source. It is a feature of the present invention that the concept of a full address set can be used for contention avoidance and flow control. Contention avoidance is enabled through the construct of a full address set as it is sized based on the number of relevant buffer access contenders. Flow control is enabled through the allocation and monitoring of full address sets to write sources.

Figure 4:
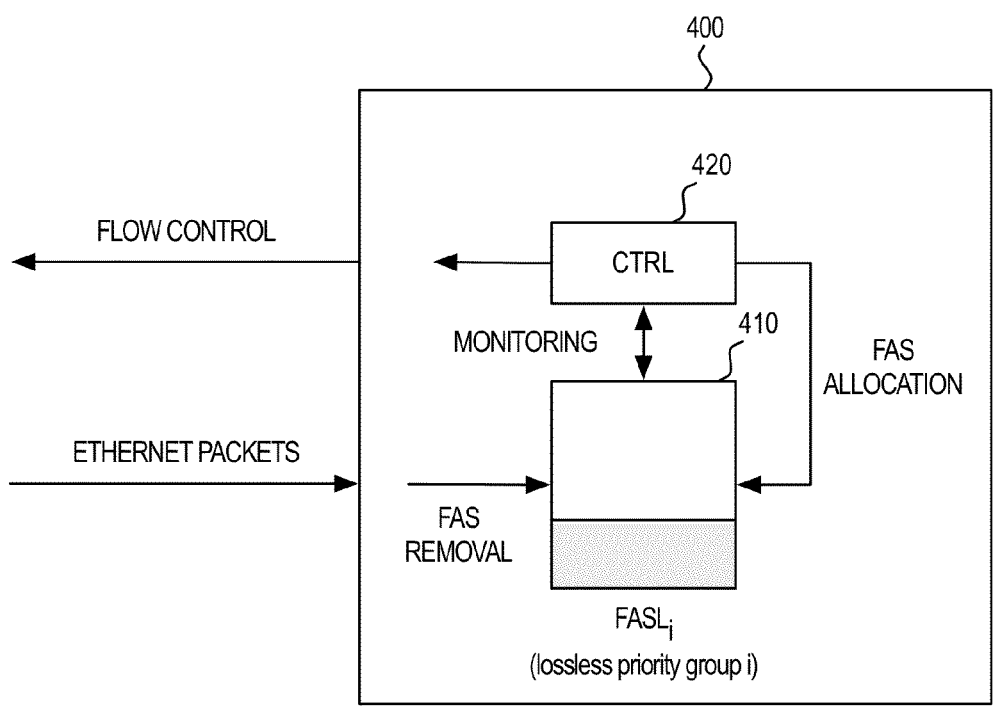
FIG. 4 illustrates an example flow control mechanism of the present invention.

FIG. 4 illustrates an example flow control mechanism of the present invention. As illustrated, switch 400 includes a full address set level element 410 that is configured to track the number of full address sets that have been allocated to a write source. As illustrated, full address set level element 410 can be associated with a given lossless priority group "i" that is defined amongst a plurality of priority groups (PGs) that are handled by switch 400. As describe above, each full address set assures that the write source will have a free cell location in the packet buffer to perform a write. Thus, the total number "X" of full address sets that have been allocated to a write source identifies the total number "X" of packets that the write source is assured of being able to write to the packet buffer without conflict.

In providing lossless performance, the receiver (i.e., switch) can be configured to cooperate with a sender of packets to ensure that all of the packets that are sent by the sender can be accommodated by the packet buffer in the receiver. In a flow control scheme such as priority-based flow control defined in IEEE 802.1Qbb, lossless performance is dependent on the guaranteed headroom of the packet buffer for a given lossless class. As would be appreciated, the amount of headroom needed can be based on the link length, link speed, processing delays, etc. In the present invention, the guaranteed headroom can be based on the number of full address sets that have been allocated to a write source. This number of full address sets can be represented by the full address set level.

As illustrated, controller 420 can be configured to monitor the full address set level for a write source. In one embodiment, such monitoring by controller 420 can be based on one or more static or dynamic thresholds that relate to a determined headroom level, a buffer exhaustion level, etc. for a write source. Based on such monitoring, controller 420 can be configured to allocate full address sets to the write source so that the full address set level is equal to or greater than a desired target level. In general, when Ethernet packets are written by the write source into the packet buffer at the memory address of a free cell in a full address set, a full address set is removed from the allocation to the write source. The full address set level is thereby decreased by one. As FIG. 4 further illustrates, controller 420 can also be configured to generate a control signal that can initiate the transmission of a flow control signal to the sender. In one example, the flow control signal such as a priority-based flow control signal is generated when the full address set level drops below a static or dynamic threshold that indicates a risk of packet buffer exhaustion.

Figure 5:
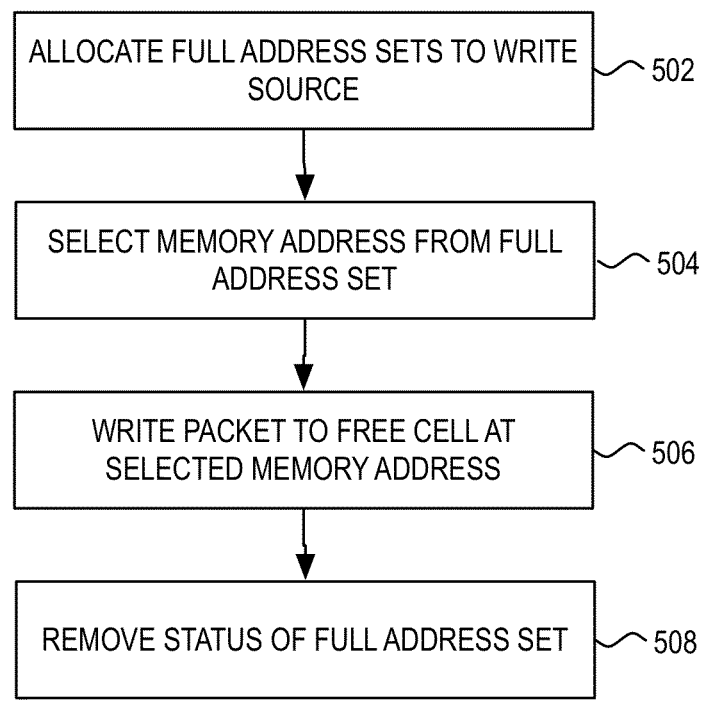
FIG. 5 illustrates a flowchart of a process of the present invention.

Having described a general framework for allocating full address sets, reference is now made to FIG. 5, which illustrates a flowchart of a process of the present invention. Full address set allocations can be used for contention avoidance and flow control. These processes are dependent on proper allocation and de-allocation of full address sets.

As illustrated, the process begins at step 502 where full address sets are allocated to a write source. As noted above, this continued allocation process can be triggered based on the monitoring of a full address set level to ensure that the full address set level is equal to or greater than an amount that corresponds to a desired amount of headroom. As would be appreciated, the particular mechanism by which a desired amount of headroom is determined would be implementation dependent and would not limit the scope of the present invention. The continued allocation of full address sets to a write source assures that a write source has access to a packet buffer, notwithstanding the actions of other buffer access contenders.

In one embodiment, the number of full address sets that is desired for a write source can be based on the monitoring of full address set consumption over time. Thus, in one example, the target full address set level can vary dynamically over time based on the monitored characteristics of full address set consumption. In another embodiment, a statistical allocation can be implemented where each write source is allocated only a percentage (e.g., 80%) of the required or otherwise desired full address set level. These percentages can be uniform across the various write sources, or may vary.

Regardless of the target allocation of the full address set level, the write source would select, at 504, a memory address from an allocated full address set when a packet is written to the packet buffer. As the memory address came from an allocated full address set, no conflict in the write can occur. The packet is then assured of being written to the free cell at the selected memory address at step 506.

The writing of the packet to the packet buffer leads to a removal of the status of the full address set at step 508. In one embodiment, the remaining free cells of the full address set can be released for future use, or can immediately form the basis for creation of another full address set. In one embodiment, the remaining free cells of the full address set can be retained as a partial address set. Such partial address sets would not guarantee that a writer would have access to the packet buffer. Partial address sets are still advantageous, however, as they do provide a less than guaranteed statistical opportunity for the write source to write a packet to the packet buffer. In one embodiment, a write source can have an allocation of full address sets and partial address sets, such that statistical allocation based on the relative number of full address sets and partial address sets can be implemented. Here, it should be noted that the usage of partial address sets still retain an allocation property that is tied to actual cell locations in the packet buffer.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A switch, comprising:
   a first number of write sources;
   a second number of read sources;
   a plurality of shared memory banks that facilitate access by the first number of write sources and the second number of read sources; and
   a controller that is configured to allocate full address sets to one of the first number of write sources, wherein each full address set includes a third number of memory addresses, each memory address in the third number of memory addresses being associated with a different shared memory bank, the third number being at least as large as the first number, the controller being further configured to monitor a fourth number of full address sets that are available to the first of the plurality of write sources, and to generate a flow control message based on the monitoring,
   wherein the one of the first number of write sources selects one of the memory addresses from a full address set when writing a packet to a shared memory bank.

2. The switch of claim 1, wherein the third number is equal to the first number.

3. The switch of claim 1, wherein the third number is equal to the first number plus the second number.

4. The switch of claim 1, wherein the controller implements a write first policy.

5. The switch of claim 1, wherein the controller implements a read first policy.

6. A method performed by a switch, comprising:
   allocating full address sets to one of a first number of write sources that writes packets to a plurality of shared memory banks, a second number of read sources reading the packets from the plurality of shared memory banks, wherein each full address set includes a third number of memory addresses, each memory address in the third number of memory addresses being associated with a different shared memory bank, the third number being at least as large as the first number;
   selecting, by the one of the first number of write sources, one of the memory addresses from a full address set;
   writing, by the one of the first number of write sources, a packet to a shared memory bank at the selected memory address, wherein the writing of the packet to the selected memory addresses removes a status of the address set containing the selected memory address as a full address set;
   monitoring a fourth number of full address sets that are available to the first of the plurality of write sources; and
   generating a flow control message based on the monitoring.

7. The method of claim 6, wherein the third number is equal to the first number.

8. The method of claim 6, wherein the third number is equal to the first number plus the second number.

9. The method of claim 6, further comprising changing, after the writing, a designation of the address set containing the selected memory address from a full address set to a partial address set.

10. The method of claim 6, wherein the monitoring comprises comparing the fourth number to a threshold value.

11. A method performed by a switch, comprising:
    selecting, by one of a first number of write sources that write packets to a plurality of shared memory banks, one of a plurality of full address sets that are available to the one of the first number of write sources, a second number of read sources reading packets from the plurality of shared memory banks, wherein each full address set includes a third number of memory addresses, each memory address in the third number of memory addresses being associated with a different shared memory bank, the third number being at least as large as the first number;
    writing, by the one of the first number of write sources, a packet to a shared memory bank at one of the memory addresses in the selected one of the plurality of full address sets;
    reducing, based on the writing, a number of full address sets that are available to the one of the first number of write sources;
    monitoring the number of full address sets that are available to the first of the plurality of write sources; and
    generating a flow control message based on the monitoring.

12. The method of claim 11, wherein the third number is equal to the first number.

13. The method of claim 11, wherein the third number is equal to the first number plus the second number.

14. The method of claim 11, further comprising changing, after the writing, a designation of the address set containing the selected memory address from a full address set to a partial address set.

15. The method of claim 11, wherein the monitoring comprises comparing the monitored number of full address sets to a threshold value.

* * * * *